United States Patent
Hwu et al.

(10) Patent No.: US 7,097,772 B2
(45) Date of Patent: *Aug. 29, 2006

(54) METHOD OF PURIFYING A WASTE STREAM USING A MICROPOROUS COMPOSITION

(75) Inventors: Shiou-Jyh Hwu, Clemson, SC (US); Qun Huang, Clemson, SC (US); Mutlu Ulutagay, Anderson, SC (US)

(73) Assignee: Clemson University, Clemson, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/084,884

(22) Filed: Mar. 21, 2005

(65) Prior Publication Data

US 2005/0180909 A1    Aug. 18, 2005

Related U.S. Application Data

(62) Division of application No. 10/755,872, filed on Jan. 12, 2004, now Pat. No. 6,890,500, which is a division of application No. 09/439,522, filed on Nov. 12, 1999, now Pat. No. 6,719,955.

(60) Provisional application No. 60/108,031, filed on Nov. 12, 1998.

(51) Int. Cl.
*B01J 49/00*    (2006.01)

(52) U.S. Cl. ............... 210/670; 210/682; 210/688; 423/239 D

(58) Field of Classification Search ............... 210/681, 210/682, 688, 670; 423/239.1
See application file for complete search history.

(56) References Cited

U.S. PATENT DOCUMENTS

| | | | |
|---|---|---|---|
| 4,329,328 A | 5/1982 | McAnespie et al. | |
| 5,013,537 A | 5/1991 | Patarin et al. | |
| 5,015,453 A | 5/1991 | Chapman | |
| 5,137,706 A | 8/1992 | Annen et al. | |
| 5,152,972 A | 10/1992 | Gier | |
| 5,302,362 A | 4/1994 | Bedard | |
| 5,801,114 A | 9/1998 | Durand et al. | |
| 5,879,645 A | 3/1999 | Park et al. | |
| 5,935,552 A | 8/1999 | Bedard | |
| 6,007,790 A | 12/1999 | Bedard et al. | |
| 6,455,463 B1 | 9/2002 | Labarge et al. | |
| 6,719,955 B1 * | 4/2004 | Hwu et al. ............ | 423/306 |
| 6,890,500 B1 * | 5/2005 | Hwu et al. ............ | 423/239.1 |

* cited by examiner

*Primary Examiner*—Chester T Barry
(74) *Attorney, Agent, or Firm*—Dority & Manning, P.A.

(57) ABSTRACT

The invention is directed to open-framework and microporous solids well suited for use in catalysis and ion exchange. The microporous solids are constructed by using a salt template which can be readily removed without destroying the framework of the micropore. Various microporous solids can be formed having different geometric structures depending upon the templating salt used and the concentration. Examples of two compounds include $Na_2Cs[Mn_3(P_2O_7)_2]Cl$ and $K_{2.02}Cs_{2.90}[Cu_3(P_2O_7)_2]Cl_{2.92}$. Both compounds have 3-D (Mn, Cu)-P-O frameworks.

21 Claims, 13 Drawing Sheets

$CsCl \cdot Na_2M_3(P_2O_7)_2$
(M = Mn, Fe)

$CsC1 \cdot Na_2M_3(P_2O_7)_2$
(M = Mn, Fe)

$(CsCl)_x \cdot Na_2Cu_3(P_2O_7)_2$ (x = ~3)

$(AC1)_x \cdot A_2M_3(X_2O_7)_2$
(M = Mn, Cu; X = P, As; A = K, Cs; x > 2)

$(CsCl)_2 \cdot Na_2Cu_3(P_2O_7)_2$ $NaCl \cdot Cs_2Fe_3(P_2O_7)_2$

METHOD OF PURIFYING A WASTE STREAM USING A MICROPOROUS COMPOSITION

RELATED APPLICATIONS

This application is a divisional application of Ser. No. 10/755,872, filed on Jan. 12, 2004, now U.S. Pat. No. 6,890,500, which is a divisional application of Ser. No. 09/439,522, filed on Nov. 12, 1999, now U.S. Pat. No. 6,719,955, which relates to Provisional Application Ser. No. 60/108,031, filed on Nov. 12, 1998;

FIELD OF THE INVENTION

The present invention is generally directed to a novel microporous solid that can be effectively used in catalytic applications, such as in automotive exhaust treatment. More particularly, the present invention is directed to a microporous composition that is constructed by employing a salt template which can be readily removed without destroying the framework of the micropore. Further, depending upon the templating salt used and the concentration of the salt, various microporous solids can be formed having different geometric structures.

BACKGROUND OF THE INVENTION

In the U.S. chemical industry, catalysts are used in over 90% of the manufacturing processes, transforming raw chemical ingredients into petroleum products, synthetic rubber and plastics, food products, chemicals, and pharmaceuticals, as well as controlling vehicle and industry emissions. Catalytic processes are involved in nearly 20% (approximately $1 trillion) of the U.S. gross domestic product and associated jobs. In economic terms, the U.S. chemical industry produces over 7,000 different products worth an estimated $375 billion per year, and generates 10% of the nation's total exports. Worldwide, the manufacture of catalysts themselves, which come in forms as disparate as biological enzymes (specialized proteins) to fine metal powders to complex inorganic compounds like zeolites, is a $10 billion industry. The chemical industry, which is highly dependent upon catalysis, has the greatest trade surplus of all U.S. industries.

However, both chemical and refining industries have lost market share in recent years. New catalyst technologies are required to develop cleaner, safer, more energy-efficient, and lower cost processes because most existing processes were conceived when energy use and pollution minimization were less important than today.

Microporous solids have been explored as one possible material for such catalytic applications (also useful in other related applications, such as sorbent and molecular sieves applications). Microporous solids comprise a fascinating class of materials with most of their interesting properties resulting from the fact that the frameworks facilitate a structurally confined space on the order of small molecules. These spaces consist of micropore structures that can be used as a microreactor allowing for selective and controlled chemical processes.

Zeolites and zeolite-type materials, for instance, are well known for their practical importance in industrial processes, such as gas separation, catalysis, and shape-selective synthesis. The naturally occurring and synthetic microporous solids, including aluminosilicates, aluminophosphates, substituted alumino-phosphates, and zinco- (or beryllo-) phosphates or arsenates, are closed-shell, diamagnetic solids.

Significant progress in the synthesis of transition-metal-containing zeolite analogues has recently occurred, mainly because of the potential importance of these materials in industrial catalysis. In particular, a great deal of research activity has occurred relating to the use of organic and inorganic templates to direct the synthesis of zeolite-type, micro- and mesoporous materials. The open-framework solids developed from such research activity conceivably possess some unique chemical properties that are derived from enhanced catalytic activity (e.g. redox chemistry with respect to the anchored transition metal center) combined with shape-selective absorptivities, as compared to the Si— and Al— based materials.

However, in these transition-metal-containing zeolite analogues, low temperatures have typically been employed during synthesis, in part, to avoid the formation of condensed frameworks. Due to such low temperatures, the templating agents used cannot be readily removed from the structure by heating without destroying the framework of micropores. Specifically, because organic or organometallic templating molecules are often bonded strongly, such as via a covalent bond, to the microporous frameworks, the framework may collapse as the templating molecule is removed. As such, the effectiveness of such materials in novel applications is thereby diminished.

Therefore, a need currently exists for a class of new cost-effective catalysts that improve the yields of products, cheapen or simplify processes, open up attractive products previously too costly to market, and/or reduce the amount of pollution. In particular, the need exists for a class of microporous solids that allow removal of the space-filling, charge-compensation molecules without disrupting the overall microporous framework.

SUMMARY OF THE INVENTION

The present invention is directed to the design, synthesis, evaluation, and modeling of new and improved catalytic materials that will better meet the needs of tomorrow's environmental and biochemical industries. The invention encompasses salt-templated microporous phosphate, arsenate, germanate and silcate analogs of zeolites. These newly discovered microporous solids exhibit superior structural, chemical, and physical properties compared to existing zeolite-based catalysts. In the proposed materials, the active sites and structures necessary for redox catalysis, for example, are included as part of the framework to facilitate easy separation and efficient recycling during the catalytic process. Further, a combinatorial approach along with the convention high-temperature, and/or high-pressure solid-state methods can be employed for properly fine-tuning the composition.

The new materials are potentially important for application in automotive exhaust treatment for pollution abatement, for removal of contaminates from alkaline solutions, for immobilization of halide salt radioactive waste, and for other various applications.

Microporous solids made according to the present invention can, in one embodiment, have a general composition as follows:

$$(\text{salt}) \cdot A_{2-y} M_3 (X_2 O_7)_2$$

wherein:
A=alkali and alkaline-earth metals
M=di- and trivalent transition metals
X=P, As, Si, Ge and wherein y is greater than or equal to 0 and less than or equal to 1. Single-crystal structural studies show that these materials exhibit microporous frameworks with the pore size in the range of from about 5.3 to about 12.7 angstroms.

In contrast to organically templated microporous solids, the materials of the present invention allow the space-filling, charge-compensation templates to be removed without destroying the framework of the micropore. The materials have a very stable framework, which can endure extensive heating up to 650° C. The materials possess very attractive chemical properties in that ion-exchange and insertion (intercalation) reactions can readily take place at room temperature.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
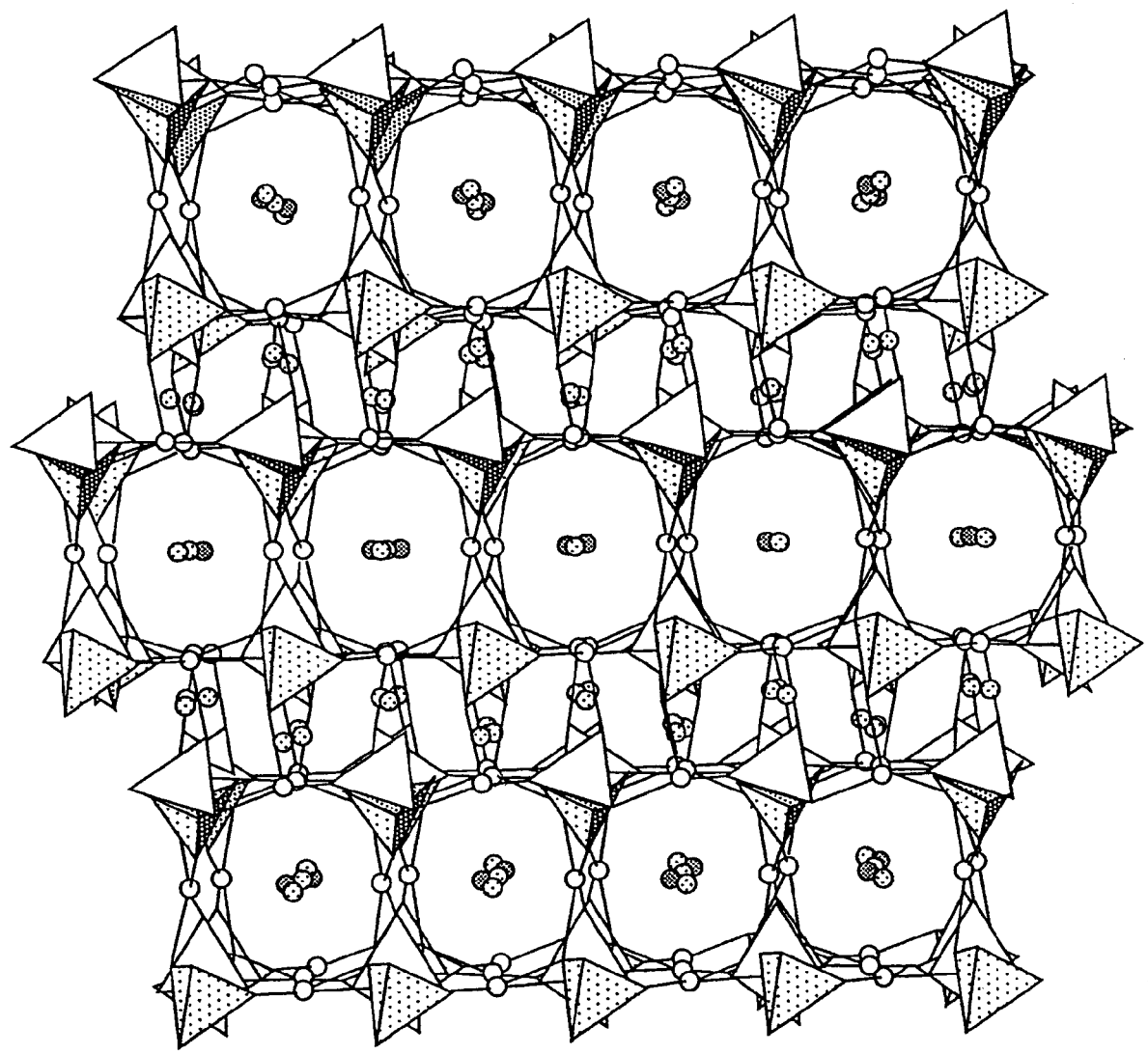
FIG. 1 is a top perspective view of one embodiment of a microporous composition made in accordance with the present invention.
Figure 1:
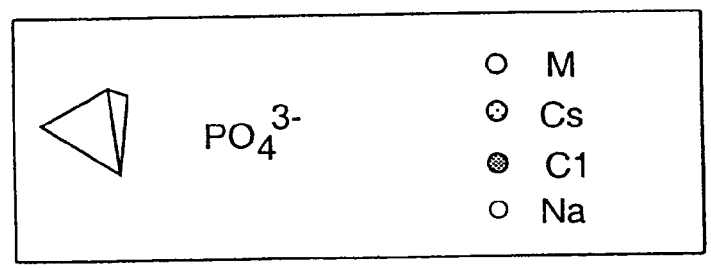
Figure 1:
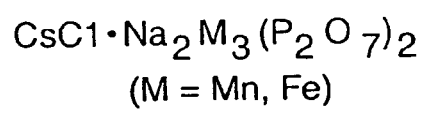

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

The present invention is directed to the design, synthesis, evaluation, and modeling of new and improved catalytic materials that will better meet the needs of modern chemical and biochemical industries. In particular, the present invention is directed to newly synthesized microporous solids that exhibit superior structural, chemical, and physical properties compared to existing zeolite-based catalysts. More particularly, the present invention is directed to salt-templated microporous phosphate, arsenate, germanate and silicate analogues of zeolites.

In a composition of the present invention, the active sites and structures necessary for redox catalysis and enantiomeric selectivity are included as part of the framework to facilitate easy separation and efficient recycling during the heterogeneous catalytic process. Specifically, a microporous structure of the present invention includes a novel framework that contains redox centers, such as di- or trivalent transition metal cations distributed uniformly in the wall of the pores. The redox centers can be formed as M—X—O, wherein the acronym M—X—O represents the contents of the micropore (M=transition metals; X=P, As, Si, or Ge; O=oxygen). Such compositions of the present invention can be potentially important for various applications, such as in automotive exhaust treatment for pollution abatement.

In accordance with the present invention, salt-templates can be effectively utilized in conjunction with the framework to synthesize unique microporous structures having novel structural, chemical, and thermal properties. In contrast to current materials that are typically prepared under mild hydrothermal conditions, such as organically templated materials, open framework structures of the present invention can be formed at relatively high temperatures with appropriate "templating" salts.

For example, halide salts are routinely employed in the present invention as a flux for crystal growth of transition-metal-containing phosphates, arsenates, germanates and silicates that otherwise only form polycrystalline phases. At a relatively high temperatures i.e. above about 600° C., at which the salt becomes molten, covalent lattices containing channel and layer structures can form. The incorporated salt behaves like a template that directs the formation of the oxide framework. In one embodiment, for example, a spiral $[CuPO_4]_\infty$ framework is built around $[BaCl]^+$ cations in a non-centrosymmetric lattice of copper(II) phosphate.

In accordance with the present invention, as stated above, the framework of a microporous composition of the present invention is generally composed of alternating M and X atoms that are interlinked by commonly shared oxygen atoms. The transition metal cations (M) adopt a [4+2] distorted octahedral coordination with four oxide anions in an otherwise square planner geometry and two halide anions from the salt lattice occupying the apical positions.

Various types of compositions can be utilized to form microporous structures of the present invention. Typically, such microporous compositions are represented by the following general formulas:

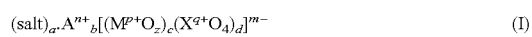

(I)

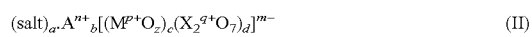

(II)

wherein:
  A=alkali and alkaline earth metals
  M=transition metals
  X=P, As, Ge or Si
  z=o to 2
  b=m/n
  m=(2z−p)c+(8−q)d (for I)
  m=(2z−p)c+(14−2q)d (for II)

For most applications, a, b, c and d are less than 20, particularly from 1 to 6.

In various embodiments of the present invention, the microporous composition can be represented by the following formula:

$$(salt).A_{2-y}M_3(X_2O_7)_2$$

wherein:
  A=alkali and alkaline-earth metals
  M=transition metals (typically di- and trivalent)
  X=comprise P, As, Si and/or Ge and wherein y is greater than or equal to 0 and less than or equal to 1.

In particular, alkali metals of the present microporous composition are preferably Li, Na, K, RB, and/or Cs. Alkaline-earth metals that may be used include Be, Mg, Ca, Sr and/or Ba. Moreover, transition metals of the present microporous composition are preferably Mn and/or Cu.

The template salt that may be used to produce microporous solids in accordance with the present invention can vary depending upon the application and the desired result. In general, any alkali or alkaline earth metal and halide salt may be used. Examples of halides that may be used to from the salt include chlorides, bromides, and iodides. Metals that may be combined with the halides include barium, cesium, rubidium, potassium, sodium, lithium, beryllium, magnesium, calcium and strontium.

The following are some preferred embodiments of microporous compositions of the present invention:

$$(CsCl).Na_2Mn_3(P_2O_7)_2$$

(hereinafter referred to as "MnPO" and illustrated in FIG. 1)

$$(Cs_3Cl_3).Na_2Cu_3(P_2O_7)_2$$

Figure 2:
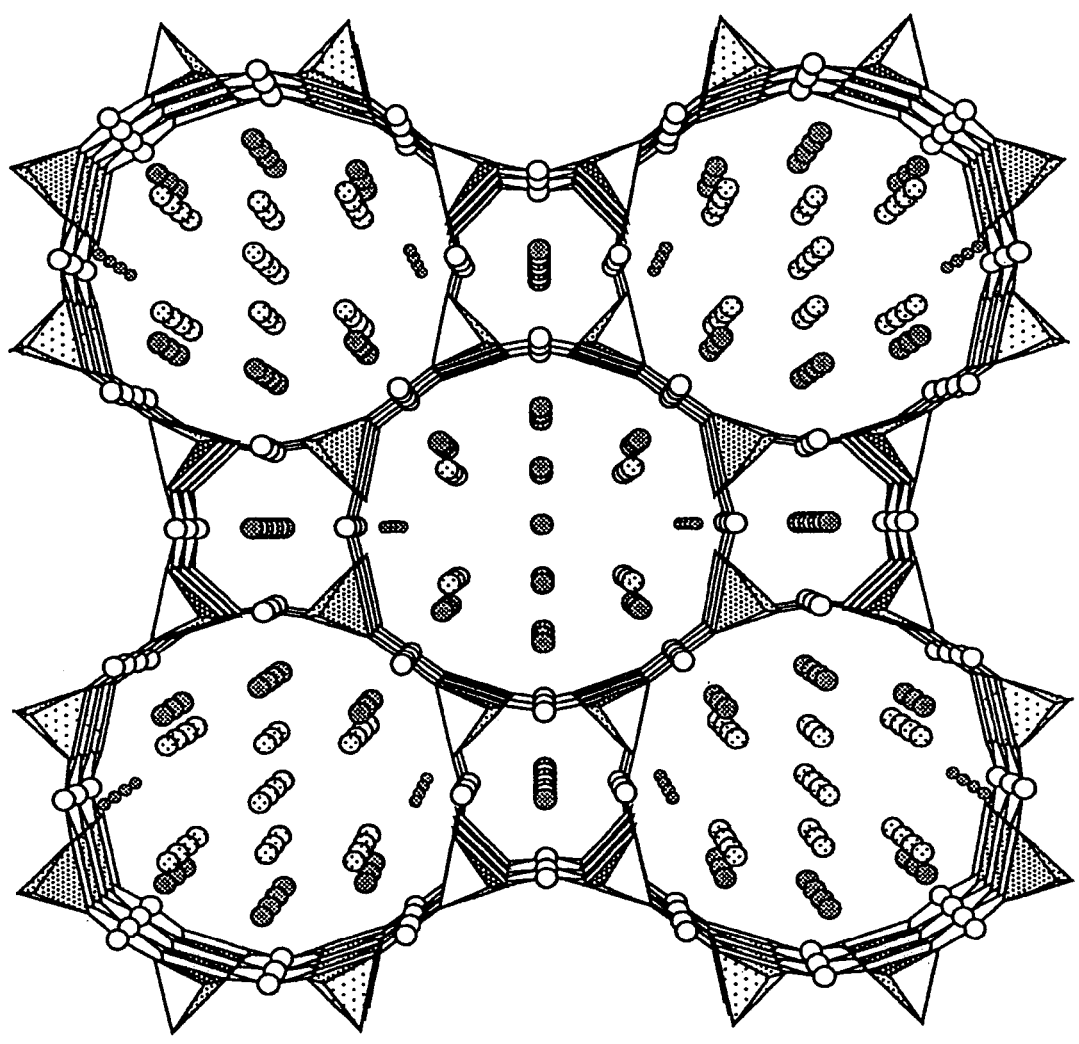
FIG. 2 is a top perspective view of another embodiment of a microporous composition made in accordance with the present invention.
Figure 2:
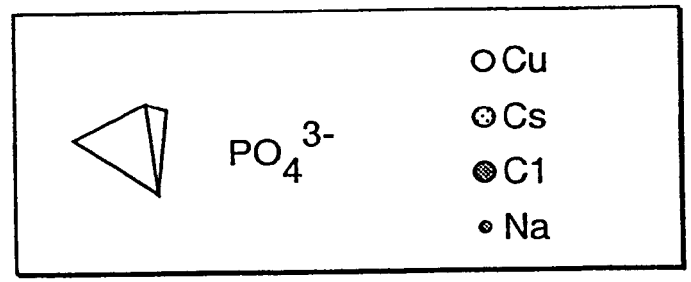

(hereinafter referred to as "CuPO" and illustrated in FIGS. 2 and 8)

$$(Rb_3Cl_3).Rb_2Cu_3(As_2O_7)_2$$

(hereinafter referred to as "CuAsO")

Figure 3:
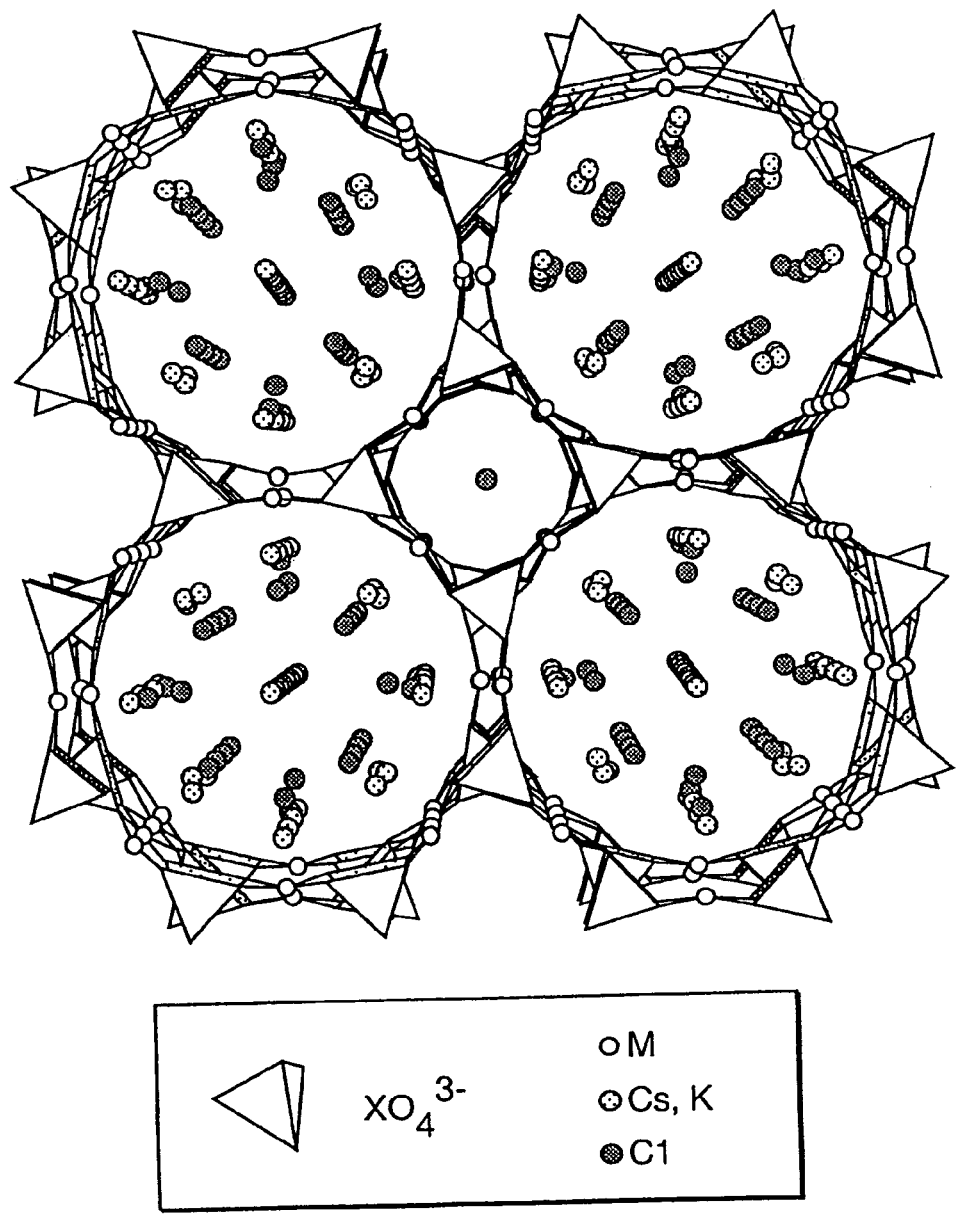
FIG. 3 is a top perspective view of another embodiment of a microporous composition made in accordance with the present invention.

It should also be noted that a microporous composition of the present invention is preferably doped with a suitable material. For example, the "CuPO" embodiment can be doped with Mn such that "M" in the above equation includes mixed Mn/Cu as shown in FIG. 3. In some instances, dopants can aid in "fine tuning" the catalytic properties of the composition so as to make a designer's catalyst for multifunctional catalysis.

As stated, microporous compositions of the present invention can prove beneficial in a variety of catalytic applications. For instance, a microporous composition of the present invention can be particularly useful in automotive exhaust treatment for pollution abatement, such as in deNOx catalysis. However, it should be understood that microporous compositions of the present invention can be utilized in various other applications as well.

The characteristics of the preferred compositions will now be further discussed. However, although the description of the preferred embodiments, and in particular the "CuPO" embodiment, is the primary focus of further discussion, it should be understood that such discussion is by way of example only, and is not in any manner intended to limit the present invention to the particular embodiments discussed.

Figure 8:
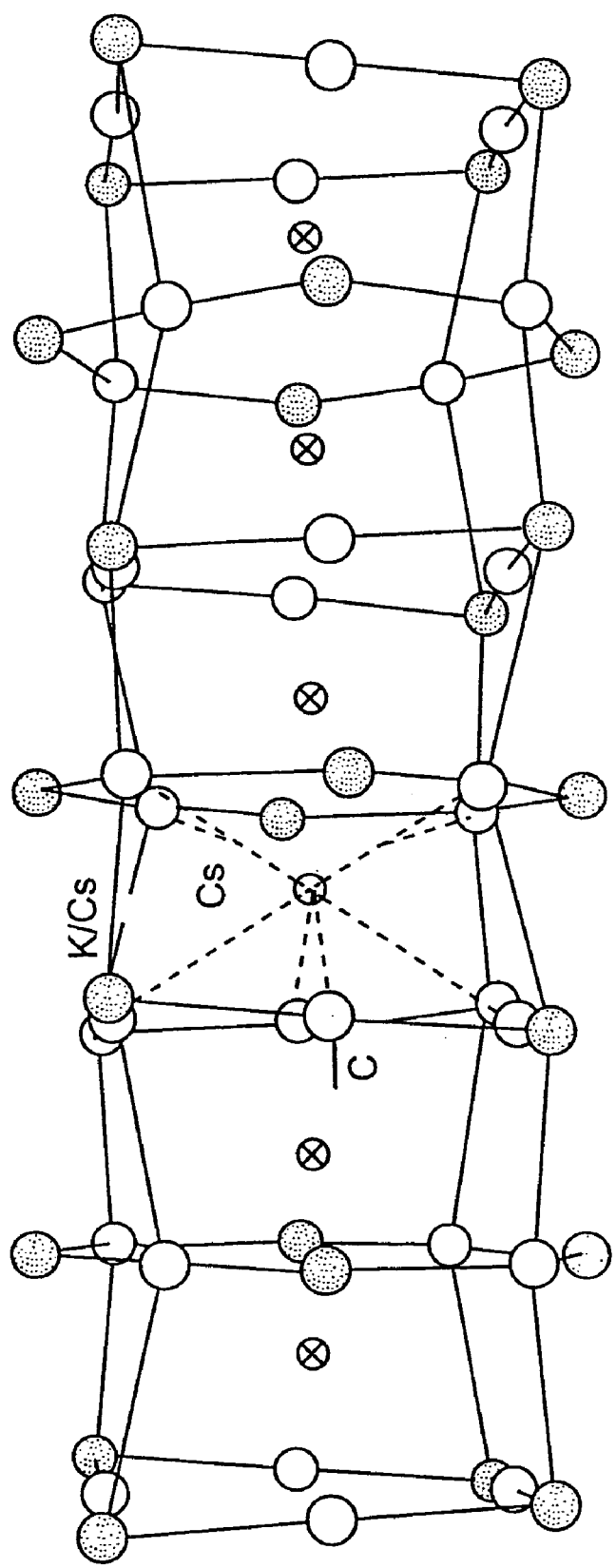
FIG. 8 is a "ball-and-stick" drawing of the structure of one embodiment of a templating salt composition of the present invention.

Referring to FIGS. 3 and 8, two different views of one embodiment of the present invention, the "CuPO" composition doped with Mn, is shown. As shown, within the skin layer of the micropores are four and eight square-planar $MO_4$ units (M=mixed Mn/Cu), respectively, with each corresponding unit facing the center of the pores. In a preferred embodiment, each M-site also contains two additional Cl atoms that occupy axial positions.

In general, the overall framework of microporous compositions of the present invention is structured such that the wall of the framework is negatively charged. For example, the overall framework of the "CuMnO" and "CuPO" embodiments of the present invention are made from alternating $MO_4$ and $P_2O_7$ units that share vertex oxygen atoms, thus giving rise to a negatively charged wall of $M_3(P_2O_7)_2{}^{2-}$. As a result of the negatively charged framework wall, about 50% or more of the cation sites in the framework are decorated by $Cu^{2+}$ cations in the embodiments illustrated in FIGS. 2 and 3.

In accordance with the present invention, the framework of the microporous compositions is also structured in a manner such that the framework forms pores or channels that enable the composition to be robust and facilitate a wide range of catalytic activities. Such pores or channels can typically vary in size. In some embodiments, the composition can contain more than one pore or channel having different sizes. For example, the "MnPO" composition can contain single-size, rectangular pores with a 5.3 Å×5.9 Å window. Likewise, the "CuPO" and "CuAsO" compositions can contain, for example, two differently sized pores of 5.3 Å and 12.7 Å in diameter.

Normally, the smaller channel of the "CuPO" embodiment of the present invention is fully occupied by a salt, while the larger channel is only partially occupied. For example, as shown in FIG. 3, the smaller channel of the "CuPO" composition doped with Mn is fully occupied by CsCl, while the larger channel is partially occupied with mixed KCl and CsCl salts present in nonstoichiometric proportions. The partial occupation of the salt in the larger channel indicates that a significantly large percentage of $Cu^{2+}$ cations (>33%) have vacant apical positions which provide accessibility for redox reaction.

In addition, the smaller and larger channels of the doped "CuPO" embodiment of the present invention can be centered by certain salts located therein. For example, as depicted in FIG. 3, the smaller channel can be centered by a linear "chain" of alternating Cs—Cl—Cs, while the larger channel can be centered by pure Cs—Cs—Cs.

In contrast to currently existing deNOx catalysts made of $Cu^{2+}$ ion-exchanged zeolite materials, the newly discovered compositions also possess anchored cation sites. For example, the "CuPO" composition includes anchored $Cu^{2+}$ cation sites. Such anchored sites can facilitate easy separation and efficient recycling during the heterogeneous catalytic process. In particular, a salt template of the present invention can be readily removed and subsequently reinserted at room temperature allowing for chemical modification and, in turn, maximization of deNOx catalytic activity.

In general, a microporous composition of the present invention also includes a salt-template lattice. In particular, as shown in FIG. 3, one embodiment of the present invention includes a salt-template lattice that resides in the large channel of a "CuPO" composition doped with Mn. An extended lattice is depicted in FIG. 8, that contains two concentric columns of square antiprismatic halide anions (e.g. Cl− anions) and alkali cations (e.g. mixed K+/Cs+ cations) for the inner and outer spheres, respectively centered by an array of monovalent cations (e.g. Cs+ cations).

According to the present invention, the removal of the salt template from the framework can be facilitated by the structure of the lattice described above. In particular, the relatively long copper-to-halogen bond, in one embodiment, can aid in the salt removal process because of the weakness of the longer bond.

For example, in a preferred embodiment, as shown in FIG. 3, the Cs+ cations that reside in the center of the larger channel are bonded to eight Cl− anions that make up the inner sphere column. Among these eight bonds, two long distances (i.e. 4.24 Å) and six short distances (i.e. 3.51–3.53 Å) are present. Likewise, a bond distance of 3.57 Å is present within the CsCl structure. Moreover, the outer sphere column includes mixed K+/Cs+ cations that give reasonable bond distances to the inner sphere Cl− anions (i.e. 2.76–3.76 Å), while the average bond distance of the cations to the CsCl structure is 3.36 Å. In addition, the K+/Cs+ cations of the outer sphere are bonded to the oxygen atoms of the "CuPO" framework, while the Cl− anions of the inner sphere are bonded to the Cu cations of the "CuPO" framework.

Based on the relatively long Cu—Cl bond distances (2.70–2.84 Å between two larger channels and 3.26 Å at the interface between larger and smaller channels), compared to those in $CuCl_2$ (2.52 Å), the interaction between the salt template and the "CuPO" framework is weak. This remains true for the salt residing in the smaller channel, where the Cu—Cl bond adopts a long distance, i.e. 2.79 Å. Such long Cu—Cl bonds as mentioned above are attributed to the partially occupied Cl− anions.

Due to these relatively long bond distances, the salt template can be removed without disrupting the framework. In particular, the salt template can be conveniently removed at room temperature by water and/or ion-exchange. In some embodiments, the composition can be treated in a manner such that a small portion of the salt still remains within the composition after being washed. For instance, in order to remove a portion of the salt template, an aqueous salt solution can be used. By controlling the concentration of salt in the solution, the amount of the salt template that is removed from the microporous solid can also be controlled.

When a portion of the salt remains in the structure after washing, the catalytic reactions of gases flowing therein can often be enhanced. In particular, due to the remaining salt, the gases can have a longer residence time in the structure, thus allowing more reaction time.

In addition to ease in removal, a composition of the present invention can possess other qualities that prove beneficial in applications other than deNOx catalysis, such as in removing contaminants from strongly alkaline solution, immobilizing halide salt radioactive waste, etc. Specifically, a composition of the present invention, after having a salt template removed by water, can be re-intercalated with other salts, such as halides or nitrates, to replenish the catalytic properties of the composition. Particular salts well suited for this purpose are chlorides and nitrate salts of alkali or alkaline earth metals.

Figure 9:
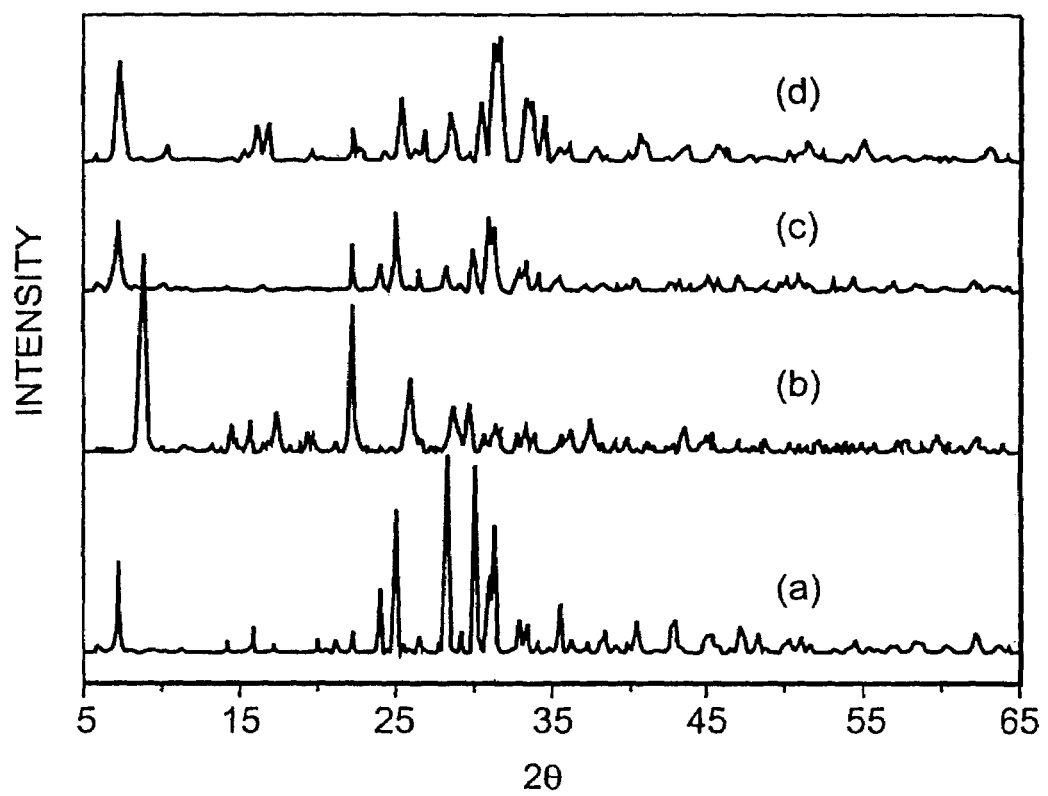
FIG. 9 are powder X-ray diffraction patterns for a "CuPO" embodiment of the present invention including a pattern for (a) the embodiment, (b) the embodiment treated with water, (c) the embodiment treated with KCl, and (d) the embodiment re-intercalated with KCl/CsCl after being treated with water FIG. 10 are TGA curves for a "CuPO" embodiment of the present invention, including (a) a TGA curve for the embodiment, (b) a TGA curve for the embodiment treated with water, (c) a TGA curve for the embodiment treated with KCl, and (d) a TGA curve for the embodiment re-intercalated with KCl/CsCl.
Figure 10:
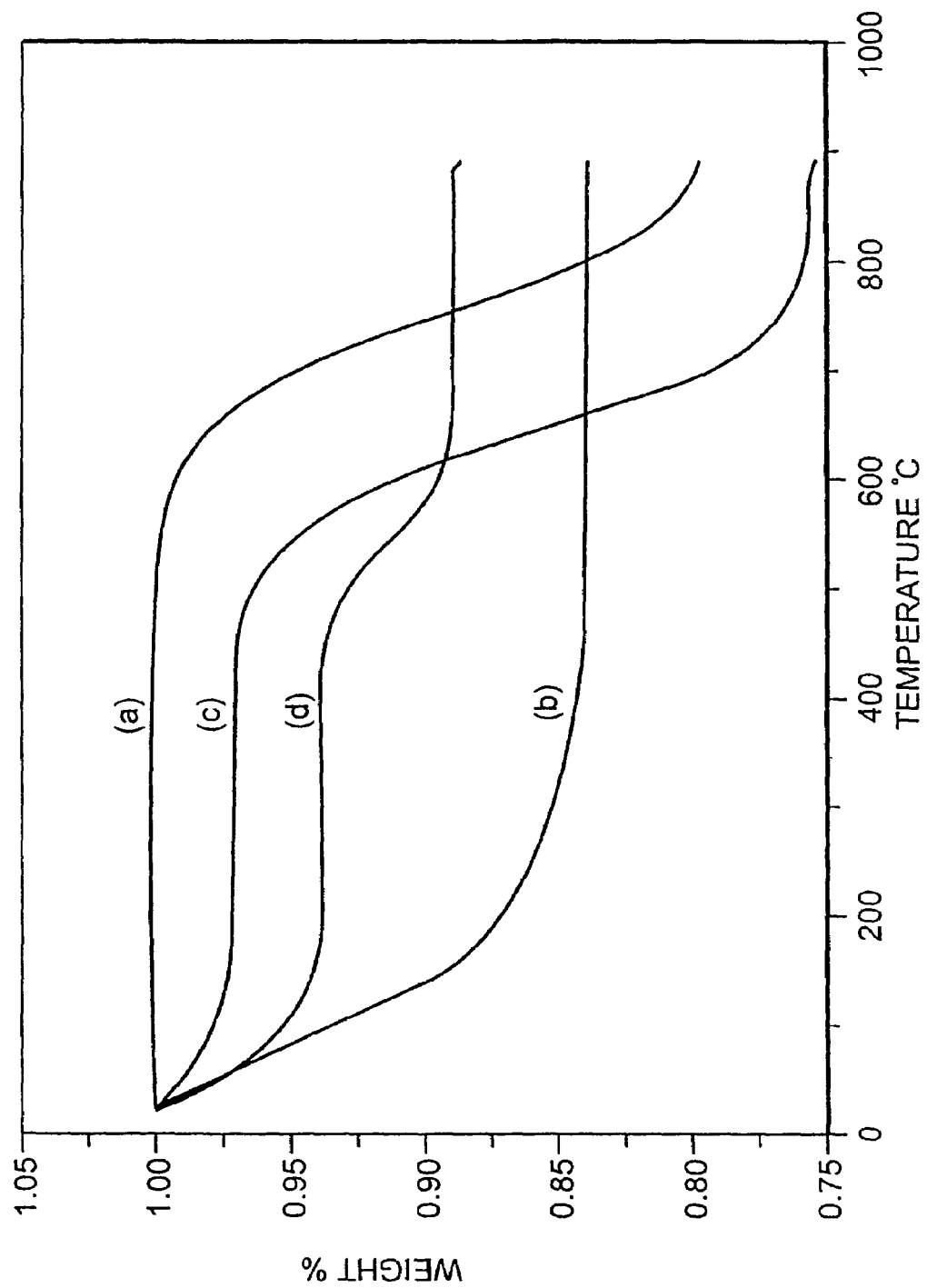

Referring to FIGS. 9 & 10, the ability of a microporous composition of the present invention to be successfully re-intercalated with salts after the original salt template has been substantially removed by water is demonstrated. In particular, FIG. 9 illustrates various powder X-ray diffraction curves, while FIG. 10 illustrates the thermal stability, determined by thermogravimetric analysis (TGA), of the "CuPO" embodiment. The polycrystalline samples that were analyzed by powder X-ray diffraction were collected at room temperature on a Philips PW1840 diffractometer with Cu—K alpha radiation (wavelength 1.5418 angstroms) and a nickel filter. NIST silicon powder was used as an internal standard. The gravimetric thermal analysis experiments that are reflected in FIG. 10, on the other hand, were carried out using a DuPont 9900 Thermal Analysis System.

As shown by curve (a) of FIG. 10, the thermal decomposition temperature of the original "CuPO" composition is about 650° C. Further, as indicated by curve (b) of FIG. 10, the $H_2O$-treated composition readily loses its water molecules when heated. However, referring to curves (c) and (d) of FIG. 10, it can be seen that a composition having re-intercalated salts displays a restored thermal stability. Thus, the heat-treated composition can be effectively re-intercalated to regain features similar to the original "CuPO" composition. It should also be noted that further experiments have shown that the porous framework of "CuPO"/$H_2O$ can remain intact, even after ten hours heating at 200° C.

Figure 4:
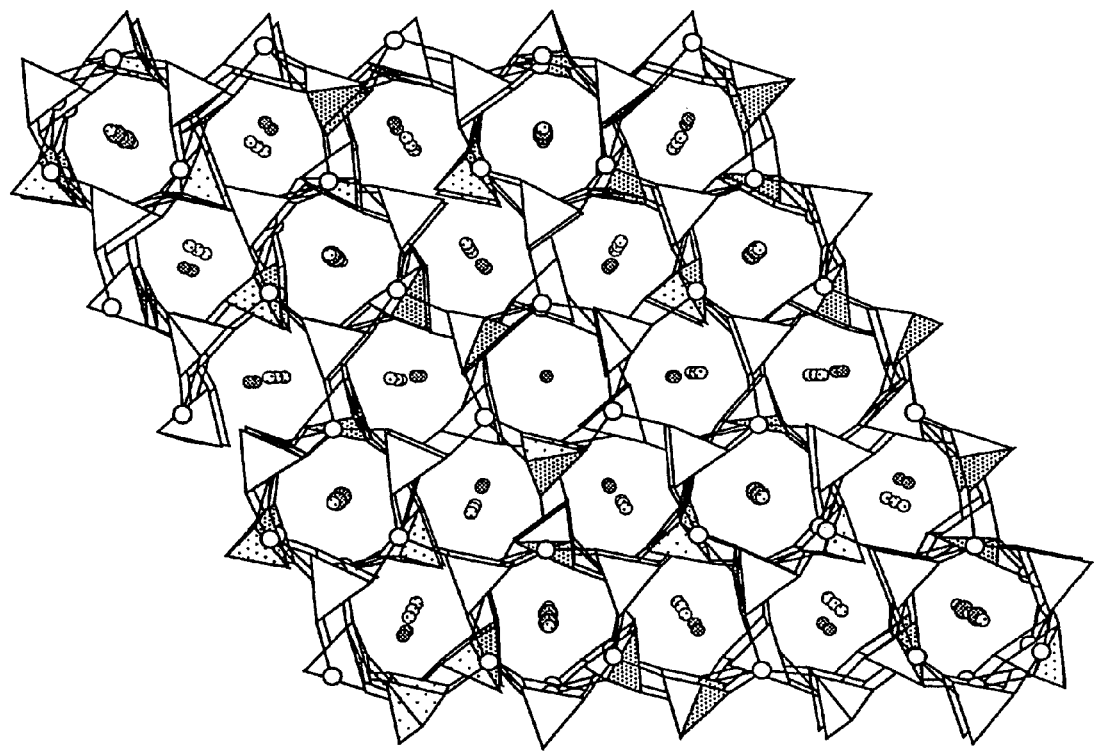
FIG. 4 is a top perspective view of another embodiment of a microporous composition made in accordance with the present invention.
Figure 4:
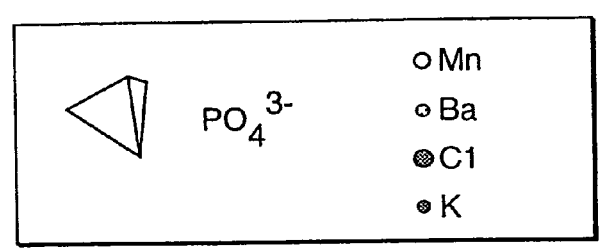
Figure 4:
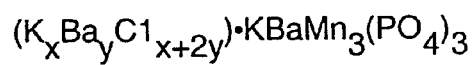
Figure 5:
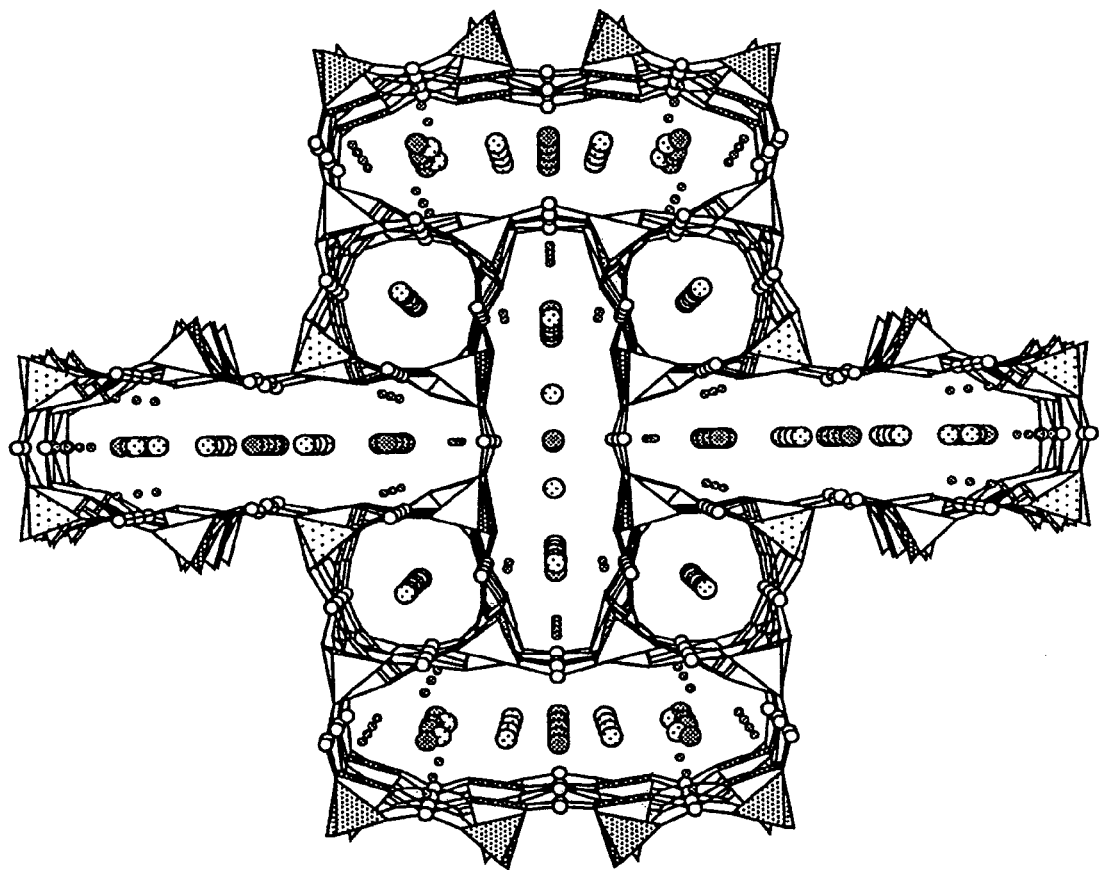
FIG. 5 is a top perspective view of another embodiment of a microporous composition made in accordance with the present invention.
Figure 5:
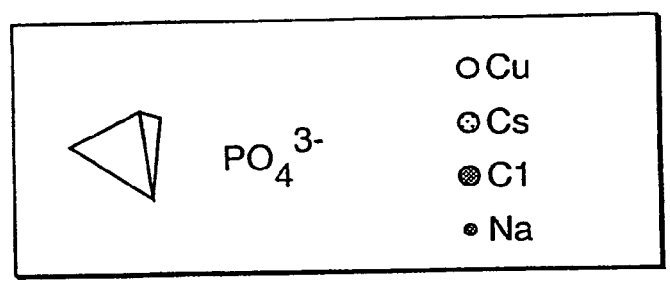
Figure 6:
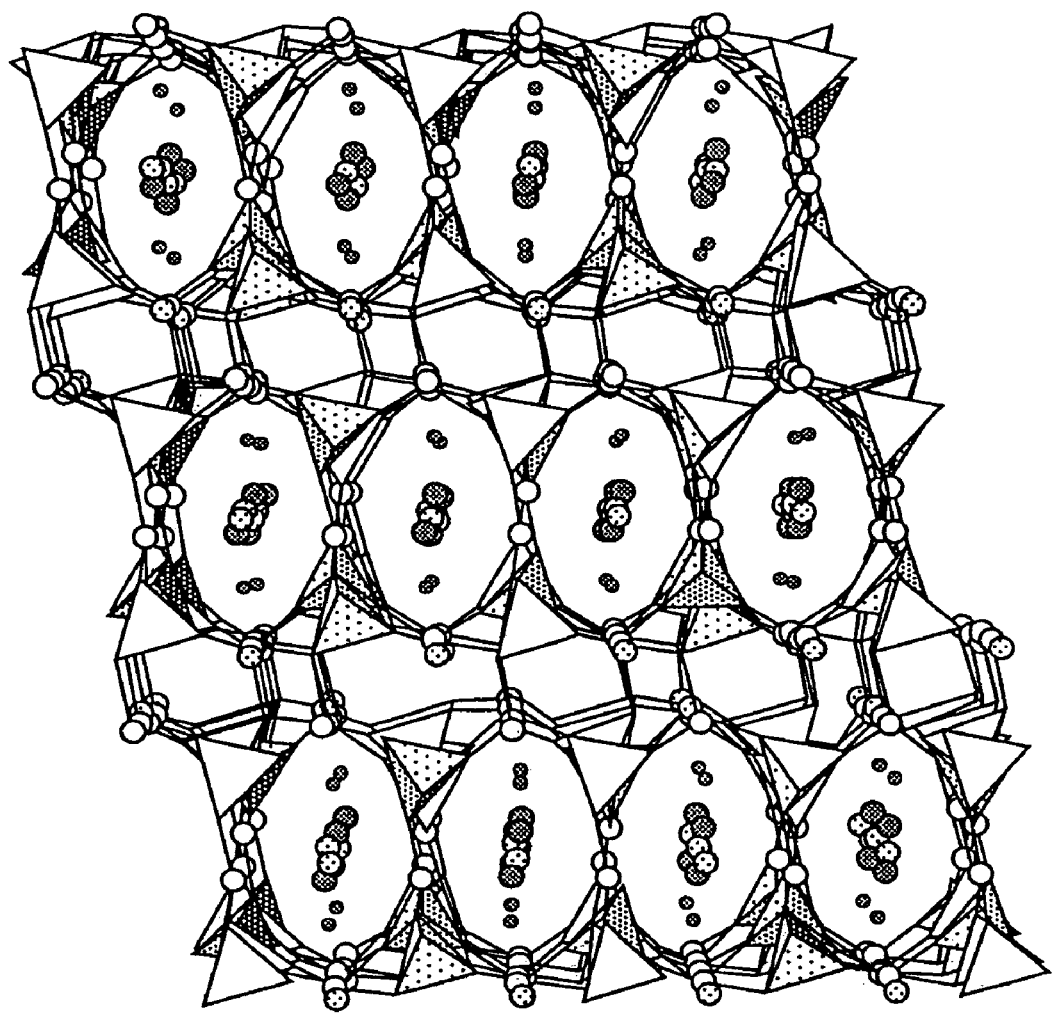
FIG. 6 is a top perspective view of another embodiment of a microporous composition made in accordance with the present invention.

In addition to the above-described embodiments, the present invention is also directed to new systems where different combinations of salt, transition metal elements, as well as tetrahedral cations, including silicon, make up novel microporous solids. For instance, besides FIG. 1 which illustrates "MnPO" and FIGS. 2 and 3 which illustrate "CuPO", FIGS. 4–6 show further embodiments of microporous solids made in accordance with the present invention. As shown, many different types of geometric structures can be formed according to the present invention by using different materials to form the microporous solids. Specifically, the geometric structure of the solid can be changed by doping the composition with an additional metal or by using a different templating salt. Further, different salts at different concentrations can also be used to form different structures.

The single crystals of new materials can be readily grown by conventional solid-state methods via halide-flux methods at temperatures approximately 150–200° C. above the melting point of the eutectic salt employed.

Figure 7A:
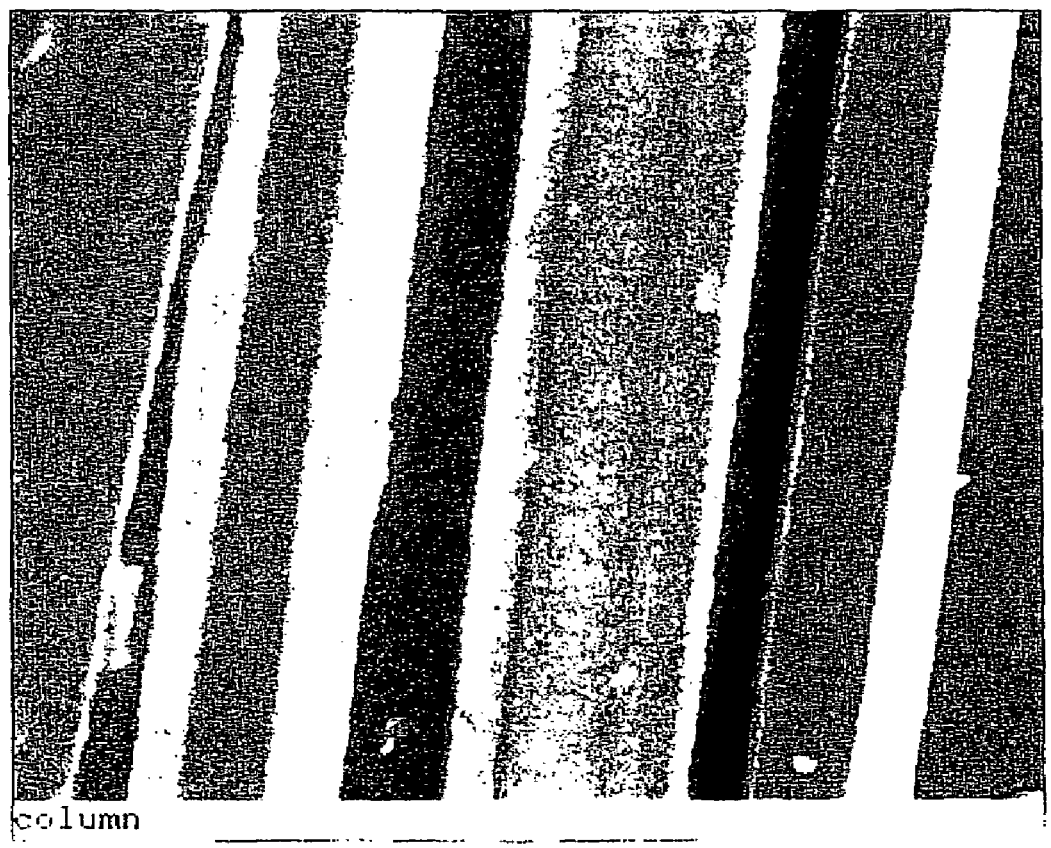
FIGS. 7(A)–7(D) are SEM images of microporous solids made in accordance with the present invention.
Figure 7B:
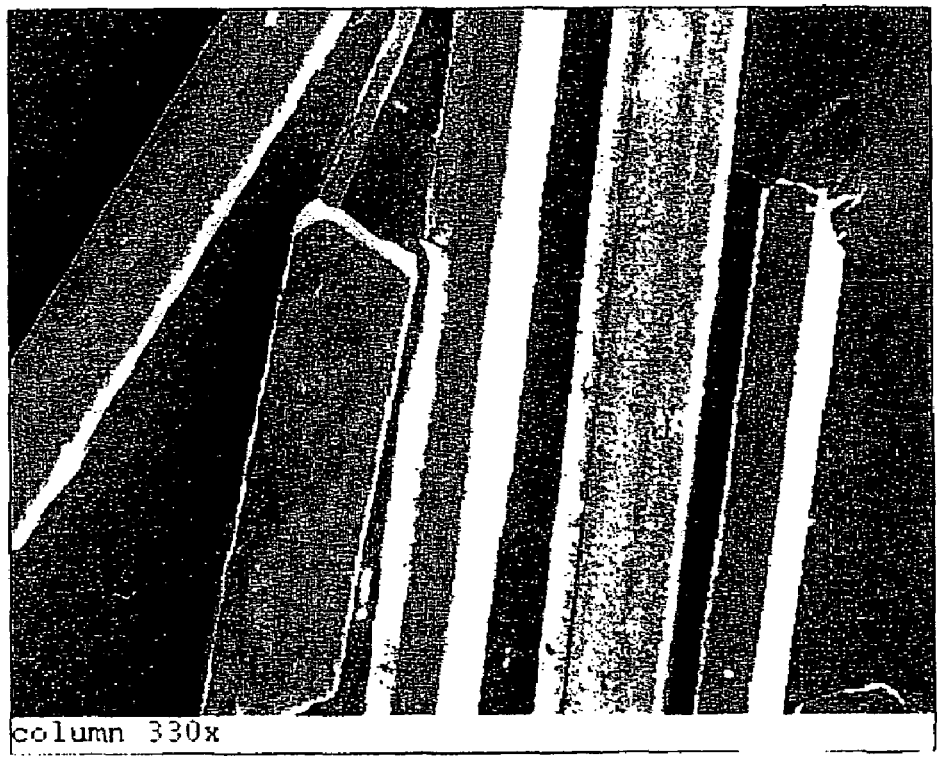
Figure 7C:
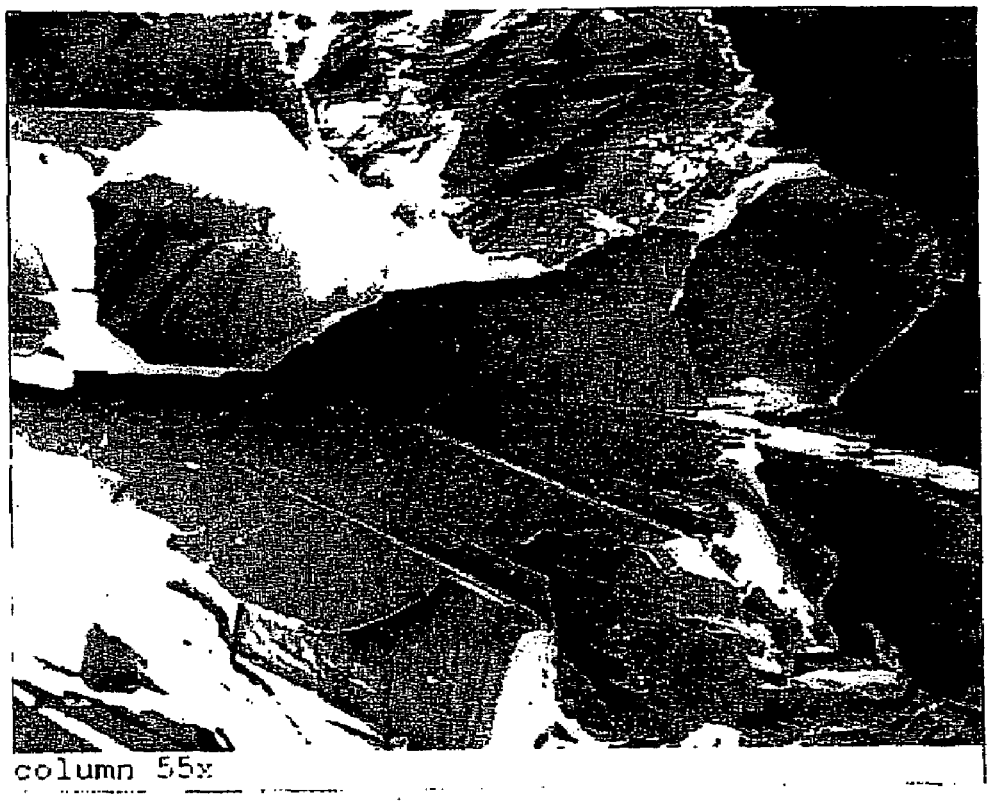
Figure 7D:

For purposes of illustration, FIGS. 7(A)–7(D) are SEM photographs of column-shaped crystals grown in the eutectic flux. FIGS. 7(A) and 7(B) are crystal morphologies of the structure illustrated in FIG. 3, while FIGS. 7(C) and 7(D) are crystal morphologies of the solid containing organic salts.

Moreover, the structural analysis also reveals that both di- and trivalent transition metal cations can be incorporated. The valence state of the d-block cation can be manipulated by controlling the A/Cl ratio (A=electropositive cation) of the starting materials. These new materials can form sizable crystals allowing for detailed structural studies with all the transition-metal sites and the coordination atoms located.

In general, microporous compositions of the present invention, as described above, can be formed in a number of ways as would be apparent to one skilled in the art. For example, one embodiment of the "CuPO" composition doped with Mn can be formed as follows. A single crystal of $(Cs_{2.76}Cl_{2.87}).K_{2.12} Cu_{2.24} Mn_{0.76}(P_2O_7)_2$ can be grown by employing a CsCl flux. In a typical reaction, 1.0 mmol of $KMnO_4$, 1.0 mmol of CuO, and 1.0 mmol of $P_2O$, are mixed and ground with CsCl flux (melting point=645° C.). The flux to charge ratio can be, for example, about 5:1.

In one embodiment, the materials above can be reacted in a carbon-coated fused silica ampoule. Preferably, the mixture is heated to about 650° C. over a 48-hour time period, and then held at that temperature for 24 hours. Thereafter, in one embodiment, the mixture can then be soaked for three days at a temperature of 800° C. and slowly cooled over a four-day period to 500° C.

In another embodiment, a stoichiometric powder of an un-doped "CuPO" composition can be prepared by mixing high purity KCl, CsCl, Cs2O, CuO, and $P_2O_5$ according to the method described above.

In general, microporous solids as described above, made in accordance with the present invention have a pore size less than 20 angstroms. In alternative embodiments of the present invention, however, it has also been discovered that microporous solids having larger pore sizes can also be fabricated. Specifically, according to the present invention, it has been discovered that systems using organic-based salts can produce large pore size structures. (FIG. 7C–D) For example, salt templates that can be used in this embodiment include alkyl amine salts, especially the halides salts of alkyl amines. For example, in one embodiment tetraethylammonium iodide can be used to produce the macroporous materials.

According to the present invention, embodiments of a composition of the present invention can also be properly fine-tuned via chemical modification methods. Such chemical modification methods can maximize the catalytic properties of a composition in a timely manner. Some parameters that can be varied include stoichiometry, concentration of dopant, and relative ratio of A/Cl. When the concentration of salt is examined, the composition of M—X—O will be fixed as well as the reaction conditions. When the mixed-transition-metal cations are studied, likewise, the salt concentration is fixed at the concentration that gives rise to the maximum materials performance.

In accordance with the present invention, it is believed that the microporous compositions can also be formed into thin films. While use of microporous compositions of the present invention in bulk form is of interest for a wide range of catalytic applications, the preparation of these materials in thin film form allows for the development of next-generation sensor and membrane reactor systems. The ability to form such thin films from compositions of the present invention can allow for the application of the compositions in time-release coatings for pharmaceutical uses.

In general, both powders and films can be prepared from sol-gel solutions. In one embodiment, powders can be prepared by vacuum drying of the solutions and heat treatment. In another embodiment, it is believed that films can be fabricated on non-reactive substrates such as magnesia and sapphire. Conventional furnace firing techniques can be used for conversion of the amorphous films into the desired zeolitic structure.

As stated above, microporous solids made in accordance with the present invention have many and diverse uses and applications. For example, as described above, the solids can be used as a redox catalyst in order to brake down nitrogen oxides. In this embodiment, which is particularly well suited as an automotive exhaust treatment, a gas containing nitrogen oxides can be fed through the microporous solids and reduced to molecular nitrogen and molecular oxygen. In particular, the nitrogen oxides will react with the transition metal, such as copper, contained within the microporous structure. In another embodiment, the microporous solids can be used for ion exchange in order to treat, for instance, waste water. For example, the microporous solids can be used remove heavy metals from water.

Another possible use of the microporous solids includes being used as a sorbent to absorb gas molecules or moisture. The solids can also be used as molecular sieves and possibly to separate large gas molecules from smaller gas molecules by filtering a gas stream flowing through the solids.

The following examples better demonstrate some of the benefits of the present invention.

EXAMPLE 1

The ability of a salt-template to be removed from a microporous composition of the present invention was demonstrated. In particular, a typical abstraction experiment was conducted, in which 100 mg of the "CuPO" embodiment of a microporous solid of the present invention was added to 15 ml of distilled water. The mixture was then stirred for approximately 10 hours at room temperature.

After stirring, the solid changed its color from light green to white in about 90 minutes, indicating the loss of the Cu—Cl bond due to chloride leaching. The resulting solid formed a very fine powder, and also showed a small concentration of cesium with a trace amount of potassium through EDAX (energy dispersive analysis by x-ray). The residual cesium and potassium suggests the following replacement reaction:

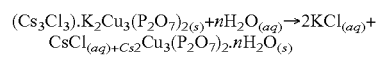

The residual cesium is believed to correspond to the amount of monovalent cations necessary to balance the negative charge of the Cu—P—O framework. As stated above, when a portion of the salt is left within the structure in this manner, after being treated with water, a longer residence time can result for gases that flow through the structure. Such longer residence time can enhance reaction efficiency in some instances.

EXAMPLE 2

The ability of a polycrystalline microporous solid of the present invention to be re-intercalated with a salt after washing was demonstrated. In particular, the templating salt of the "CuPO" embodiment was removed by the process of Example 1. Once removed, the solid was re-intercalated with a chloride salt. In particular, the solid was re-intercalated by immersing the solid in a 4 molar potassium chloride salt solution.

After re-intercalation, EDAX results showed that the residual cesium remaining from Example 1 was not present. The lack of such residual cesium suggests that the following reaction of combined ion-exchange and re-intercalation likely occurred:

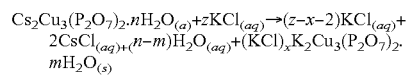

These and other modifications and variations to the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention.

What is claimed is:

1. A method of purifying a waste stream comprising:
contacting a waste stream with a microporous composition having the general formula:

$$A_b[(MO_z)_c(XO_4)_d]$$

or $$A_b[(MO_z)_c(X_2O_7)_d]$$

wherein A comprises one or more alkali or alkaline earth metals, M comprises a transition metal or a mixture of transition metals, X is phosphorous, germanium, arsenic, or silicon, O is oxygen, z is from zero to two, and b, c, and d are less than 20 and greater than 0; and reacting waste components from the waste stream with the microporous composition.

2. The method of claim 1, wherein b, c, and d are less than or equal to 6 and greater than 0.

3. The method of claim 1, wherein M is selected from the group consisting of copper, manganese, and mixtures thereof.

4. The method of claim 1, wherein the waste stream purification method is carried out at room temperature.

5. The method of claim 1, further comprising intercalating the microporous composition with a salt such that the microporous composition has the general formula:

$$(salt)_a \cdot A_b[MO_z)_c(XO_4)_d]$$

or $$(salt)_a \cdot A_b[(MO_z)_c(X_2O_7)_d]$$

wherein a is less than 20 and greater than 0 and the reaction between the waste components and the microporous composition comprises removal of the waste components from the waste stream via ion exchange with the salt.

6. The method of claim 5, wherein the salt is selected from the group consisting of an alkali salt, an alkaline earth metal salt, a halide salt, and mixtures thereof.

7. The method of claim 5, wherein the waste stream is a waste water stream.

8. The method of claim 7, wherein the waste components comprise heavy metals.

9. The method of claim 5, wherein the waste stream is an alkaline solution.

10. The method of claim 5 further comprising replenishing the catalytic properties of the microporous composition following a period of ion exchange with the waste stream, the replenishment process consisting of:
washing the microporous composition with water to remove the waste components from the microporous composition; and
reintercalating the microporous composition with a second salt.

11. The method of claim 10, wherein the method of replenishing the catalytic properties of the microporous composition is carried out at room temperature.

12. The method of claim 10 wherein the second salt is the same salt as the salt removed by the ion exchange process.

13. The method of claim 10, wherein the second salt is a chloride or nitrate salt of an alkali or alkaline earth metal.

14. The method of claim 1, wherein the waste stream comprises a salt waste component, the reaction of the waste components with the microporous composition comprising intercalating the microporous composition with the salt waste component.

15. The method of claim 14, wherein the salt waste component is radioactive.

16. The method of claim 15, wherein the radioactive salt is a radioactive halide salt.

17. The method of claim 14, further comprising removing the intercalated salt waste component from the microporous composition via an ion-exchange process.

18. The method of claim 14, further comprising washing the microporous composition with water to remove the intercalated salt waste component from the microporous composition.

19. The method of claim 1, wherein the reaction between the waste components and the microporous composition comprises reducing or oxidizing at least one component of the waste stream, wherein the framework of the microporous composition comprises redox centers distributed along the walls of the pores.

20. The method of claim 19, wherein the method is a pollution abatement method.

21. The method of claim 19, wherein the redox center is formed as

M—X—O along the walls of the microporous composition.

* * * * *